3,218,326
N-AMINOALKYL-2,3-POLYMETHYLENE-1H-BENZ-
[g]INDOLES AND METHODS OF PREPARING
SAME
Leonard M. Rice, Minneapolis, Minn., and Meier E.
Freed, Philadelphia, and Elisabeth Hertz, Bryn Mawr,
Pa., assignors to American Home Products Corporation, New York, N.Y., a corporation of Delaware
No Drawing. Filed Jan. 9, 1963, Ser. No. 250,246
6 Claims. (Cl. 260—293)

This invention relates in general to a new and novel series of N-substituted 2,3-polymethylene-1H-benz[g]indoles, methods for their manufacture and novel intermediates involved in their synthesis. In particular, in its product aspect, the invention involves the discovery of a class of N-aminoalkyl-2,3-polymethylene-1H-benz[g]indoles which are pharmacologically active, particularly in moderating the activity of the central nervous system of mammals. The essential structure of these compounds may be represented by the graphic structural formula:

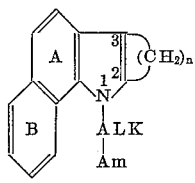

and pharmaceutically acceptable acid salts thereof, wherein $n$ represents an integer of from 4 to about 13; ALK represents a bivalent hydrocarbon radical containing from about 2 to 6 carbon atoms therein, preferably a lower alkylene radical, and Am represents an amino group. In considering our compounds they may be referred to as N-substituted or 1-substituted 2,3-polymethylene-1H-benz[g]indoles as convenience dictates.

By the term "amino group" as employed in our definition of products, it is intended to include such groups as primary amino, lower monoalkylamino, lower dialkylamino, piperidino, pyrrolidino, morpholino, piperazino, and hydroxyalkyl piperazino.

In our definition when we employ the terms "lower" mono- or dialkylamino, etc., we are referring to those lower alkyl groups containing up to about 8 carbon atoms such as methyl, ethyl, propyl, isopropyl, and the like, which may be arranged in either normal or branched chains.

We of course include acid addition salts of the bases represented above, such as the hydrochlorides, nitrates, and the like, derived from reaction with any suitable mineral acids or organic acid to form salts, such as fumarates, acetates, or succinates, to name a few which may be derived by reaction with various mono-, di-, or polycarboxylic acids.

Within the concept of our novel products as illustrated and defined above, it is possible to have those analogs wherein the rings indicated as A and B may be substituted in various positions on the rings with substituents other than hydrogen. More particularly, such preferred functional groups as lower alkyl and lower alkoxy groups containing up to about 8 carbon atoms may be placed therein by proper selection of starting materials containing these groups. Likewise halogen atoms such as chlorine, bromine, and the like, nitro, and amino groups may be inserted by the choice of starting materials or, in the case of amino groups, derived by reduction of the nitro group. These derivatives would be the equivalents of the members of the series wherein hydrogen is the substituent present on the ring. It should be further recognized that the various ring substituted groups may be present in more than one position, although mono substitution is preferred. These substituents would then be represented by compounds containing the following moiety:

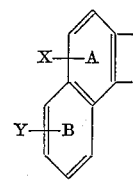

where X and Y represent the identified groups.

In its process aspect, our invention concerns not only preparation of final products, but also the preparation of certain intermediates useful in preparing the final product. In this regard, the polymethylene-1H-benz[g]indole intermediates formed constitute a separate and distinct product aspect of the invention. We may illustrate these starting intermediates by the general formula:

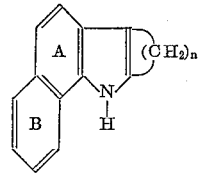

wherein $n$ represents an integer from 4 to about 13, and it is understood that the A and B rings may if desired be substituted in various manners as discussed above.

The above starting materials, which in some cases are novel, may themselves be prepared in a number of ways. One of these is as follows:

To a stirred refluxing mixture of 500 ml. of water and 172 ml. of concentrated hydrochloric acid ($d$ 1.18) add 50.0 g. of 1-naphthylhydrazine hydrochloride during five minutes. Add cycloheptanone (30.9 g.) at reflux over about fifteen minutes. The mixture is stirred and refluxed for an additional four hours and allowed to stand at room temperature overnight. The presence of some solids is noted. The liquid is stirred in an ice-bath for about one hour. The reaction mixture contains a white flocculent solid, which is decanted from a gummy residue and labelled II. The gummy residue is dissolved in 400 ml. of boiling methanol, filtered, concentrated, and a solid appearing is filtered off and labelled I. The products I and II are purified by conventional techniques, and combined to yield the starting material 2,3-pentamethylene-1H-benz[g]indole.

In a similar manner, by selection of an appropriately substituted 1-naphthylhydrazine containing the substituents X and Y in place of the 1-naphthylhydrazine employed in the above preparation, one may obtain corresponding X and/or Y substituted 2,3-polymethylene-1H-benz[g]indoles.

Alternatively, one may prepare the starting material by adding a 1-naphthylhydrazine or substituted derivative thereof during one hour to a stirred, refluxing solution of cycloheptanone in glacial acetic acid. Reflux and stir an additional hour, cool, and filter and purify the product by conventional methods. Although acetic acid has been noted, other organic acids such as formic and propionic may also be employed.

Still another method of preparation of starting material may be employed by reacting a 1-naphthylhydrazine or X and/or Y substituted derivatives thereof with a cycloalkanone such as cycloheptanone in the presence of ethyl alcohol and a mineral acid such as hydrochloric acid or phosphoric acid or the like to obtain the starting materials which are intermediates for the preparation of our novel therapeutic agents.

Following the procedures disclosed hereinabove the following compounds may be made and fall within the general scope of the invention. These compounds are also deemed useful chiefly as the free base or alkali metal salt as intermediates for the preparation of the final products enumerated:

| Intermediate | Cycloalkanone Reactant Starting Material |
|---|---|
| 2,3-pentamethylene-1H-benz[g]indole | Cycloheptanone. |
| 2,3-octamethylene-1H-benz[g]indole | Cyclodecanone. |
| 2,3-decamethylene-1H-benz[g]indole | Cyclododecanone. |
| 2,3-undecamethylene-1H-benz[g]indole | Cyclotridecanone. |
| 2,3-dodecamethylene-1H-benz[g]indole | Cyclotetradecanone. |
| 2,3-tridecamethylene-1H-benz[g]indole | Cyclopentadecanone. |

As what may be referred to as our second aspect of process invention, we have found the preparation of the antidepressant agents of the invention. Their preparation may be illustrated by the following schematic flow diagram:

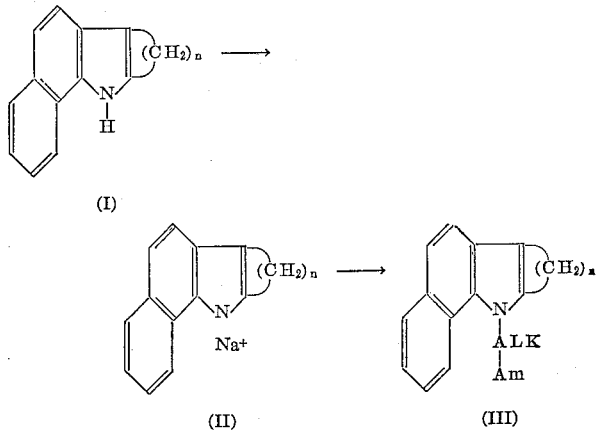

In the above reaction sequence the symbols $n$, ALK, and Am have the values defined above. The reaction generally stated involves treatment of the above intermediate starting material (I) with a suitable metalating agent such as an alkali metal hydride in a solvent such as DMF under mild conditions of reaction, i.e., temperatures of the order of 30–50° C. for periods of about one hour or less. This gives the alkali metal salt such as the sodium salt (II) which is not isolated. After cooling the reaction mixture, the salt is alkylated with any suitable alkylating agent such as a dialkylaminoalkyl halide or the like. Tosylates or mesylates of various alcohols may conveniently be used at this point as such agents. The conditions of this reaction are also relatively mild, i.e., not exceeding about 60° C. for from about 1 to 4 hours' duration to yield the final product (III) which is then purified by conventional techniques.

As a more specific illustration of the process aspect generally described in the preceding paragraph, we may consider the preparation of the compound N-(3-dimethylaminopropyl)-2,3-pentamethylene - 1H - benz[g]indole from the starting material 2,3-pentamethylene-1H-benz[g]indole (derived as indicated hereinabove) by initially reacting the starting material taken up in 40 ml. of DMF with sodium hydride, also in DMF, at a temperature of 35° C. for one hour. After cooling, reaction with γ-dimethylaminopropyl chloride yields the crude final product. Upon purification, the product obtained is reacted with fumaric acid to form the fumarate salt, which is ready for use.

As a preferred product aspect of our invention, we find a particular group of compounds, among them the compound above prepared, which are particularly desirable anticonvulsant agents. These may be represented at least in part by the general formula:

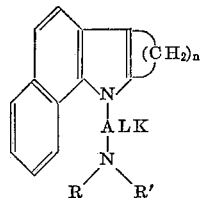

wherein ALK has the values set forth above; $n$ represents the integer 5; and R and R' each represent a lower alkyl group as above defined. In a series of studies on test animals, this type of compound has been found to effect a desirable central nervous system moderation on the test animal absent undesirable side effect on blood pressure, respiratory rate, heart rate of the animal.

The novel compounds of the invention therefore are useful in that they are in general non-toxic central nervous system modifiers exhibiting antidepressant activity, anticonvulsant activity, and the like at relatively low dose levels and tranquilizing activity at relatively high dose levels. In addition, they are useful as intermediates in preparation of pharmaceutically active agents as hereinabove demonstrated, as well as being generally useful for pharmacological experimentation and evaluation of other compounds. In a particular use aspect they may exhibit activity as appetite depressants, particularly when employed and administered as potentiators of amphetamines of various types.

The novel compounds of the invention, when contemplated for use in pharmaceutical formulations, may be admixed if desired with a large number of compatible diluents, carriers, and the like to form a pharmaceutical composition. Oral administration is preferred for rapid onset of effect, and in this regard, solid excipients, binders, extenders, or carriers such as carboxymethylcellulose, starches, sugars, and the like may be employed where tablets or powders are to be employed. Such liquid carriers as mineral oil or a pharmaceutically acceptable lower aliphatic alcohol may be used where injectables for parenteral administration are to be prepared. Glycerine or the like may be used where a syrup is to be used to administer the compound. The dosage may range from 0.5 mg. to about 100 mg. per kilogram of body weight, although around 50 ml./kg. per day is the preferred daily dosage for optimum result, and this will vary with the complexities of the particular case.

The following examples further illustrate several of the product and process aspects of our general concept of invention. They further provide several concrete embodiments of both of these aspects in the way of experimental detail sufficient to enable one skilled in the art to practice the general teaching of our discovery. In several of the examples, methods have been repeated in those cases where the reaction times, temperatures, order of reagent addition, etc., and other process details are similar to those elaborated in the first few examples. Unless otherwise indicated, the quantities of reagents are in grams, and the temperatures in degrees centigrade.

It is to be understood that these several illustrative embodiments may not be construed to be more than illustrative of experimental detail, and in this respect do not limit in any manner the legal scope of our inventive concept. For a proper legal definition of such scope, attention is directed to the several claims appended herewith.

EXAMPLE 1

*1-(3-dimethylaminopropyl)-2,3-pentamethylene-1H-benz[g]indole*

Add slowly to 0.6 g. (0.024 mole) of sodium hydride (as 1.2 g. of a 48% dispersion) suspended in 10 ml. of dimethyl formamide a solution of 4.71 g. of 2,3-pentamethylene-1H-benz[g]indole (0.02 mole) in 40 ml. of dimethyl formamide, accompanied by vigorous stirring. Stir the reaction mixture at 30–35° C. for about one hour or until hydrogen is no longer evolved. Cool the mixture to 15° C. and add freshly distilled γ-dimethylaminopropyl chloride (2.43 g. or 0.02 mole). Stir the mixture and heat at about 50° C. for 3 hours. The reaction is quenched by pouring into 125 ml. of ice water. Acidify the mixture to a pH of 1 with 10 ml. of concentrated hydrochloric acid. Extract with 250 ml. of petroleum ether in 4 portions. The aqueous phase is made strongly alkaline with 40% aqueous sodium hydroxide, then extract again with 300 ml. of ether in 5 portions. Wash the combined ether extracts with saturated sodium chloride solution and dry over anhydrous magnesium sulfate. Evaporate the solvent, dissolve in acetone, and add to a solution of 2.32 g. of fumaric acid (0.02 mole) in 250 ml. boiling acetone. Remove the resulting precipitate by filtration. After recrystallization from methanol-ether, the fumarate salt melts at 184.5–186° C.

*Anal.*—Calcd. for $C_{26}H_{32}N_2O_4$: C, 71.53; H, 7.39; N, 6.42. Found: C, 71.46; H, 7.27; N, 6.37.

EXAMPLE 2

*1-(2-piperidinoethyl)-2,3-pentamethylene-1H-benz[g]indole*

Follow the general reaction procedure specified in Example 1 above, using 5.49 g. (0.0234 mole) of the reagent 2,3-pentamethylene-1H-benz[g]indole and 1.42 g. of the sodium hydride used and 3.46 g. of N-β-chloroethylpiperidine for the diethylaminopropyl chloride employed to obtain the product of this example, M.P. 215–216° C.

*Anal.*—Calcd. for $C_{28}H_{34}N_2O_4$: C, 72.70; H, 7.41; N, 6.02. Found: C, 72.49; H, 7.23; N, 6.08.

EXAMPLE 3

*1-(3-dimethylaminopropyl)-2,3-hexamethylene-1H-benz[g]indole*

Add slowly to 0.11 mole of sodium hydride suspended in about 10 ml. of dimethyl formamide a solution of 0.1 mole of 2,3-hexamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled γ-dimethylaminopropyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 4

*1-(3-dimethylaminopropyl)-2,3-tridecamethylene-1H-benz[g]indole*

Add slowly to 0.11 mole of sodium hydride suspended in about 10 ml. of dimethyl formamide a solution of 0.1 mole of 2,3-tridecylmethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled γ-dimethylaminopropyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide, and extract with 300 ml. of an organic extraction liquid such as ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 5

*1-(3-morpholinopropyl)-2,3-pentamethylene-1H-benz[g]indole*

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled γ-morpholinopropyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 6

*1-(2-pyrrolidinoethyl)-2,3-pentamethylene-1H-benz[g]indole*

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled 2-pyrrolidinoethyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 7

*1-(2-diethylaminoethyl)-2,3-pentamethylene-1H-benz[g]indole*

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled 2-diethylaminoethyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 8

1-(6-dimethylaminohexyl)-2,3-pentamethylene-1H-benz[g]indole

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled 6-dimethylaminohexyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution, dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 9

1-[3-(4-methylpiperazino)propyl]-2,3pentamethylene-1H-benz[g]indole

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled 3-(4-methylpiperazino)propyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 10

1-(3-piperazinopropyl)-2,3-pentamethylene-1H-benz[g]indole

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled γ-piperazinopropyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution and dry over anhydrous magnesium sulfate to obtain the product of this example.

By treatment of the free base obtained above taken up in a solvent such as acetone with a suitable acid such as fumaric acid in boiling acetone a precipitate which is formed is recrystallized from methanol-ether to obtain the corresponding organic acid salt of the base.

EXAMPLE 11

1-(3-[4-(2-hydroxyethyl)piperazino]propyl)-2,3-pentamethylene-1H-benz[g]indole

Add slowly to 0.11 mole of sodium hydride suspended in about 10 ml. of dimethyl formamide a solution of 0.1 mole of 2,3-pentamethylene-1H-benz[g]indole in 40 ml. of dimethyl formamide with stirring. Stir the reaction mixture at 30–35° C. for about one hour. Cool the reaction mixture to 15° C. and add 0.11 mole of freshly distilled 3-[4-(2-hydroxyethyl)piperazino]propyl chloride. Stir the mixture and heat at about 50° C. for about 3 hours, quenching by pouring into about 125 ml. of ice water. Acidify to a pH of 1 with concentrated hydrochloric acid. Extract with 250 ml. of petroleum ether in portions. Alkalize the aqueous phase with 40% aqueous sodium hydroxide and extract with 300 ml. of an organic extraction liquid such as ether in 5 portions. Wash the ether extract with a saturated saline solution and dry over anhydrous magnesium sulfate to obtain the product of this example.

EXAMPLE 12

1-(3-methylaminopropyl)-2,3-pentamethylene-1H-benz[g]indole

Add acrylonitrile (29.2 g., 0.55 mole) slowly with cooling to a solution of 2,3-pentamethylene-1H-benz[g]indole (117.5 g., 0.5 mole), and 2 ml. of a 40% methanolic solution of trimethylbenzylammonium methoxide in 300 ml. of benzene. Stir for an hour, add conc. hydrochloric acid, wash the benzene solution with water, and dry over sodium sulfate. Evaporate the solvent and recrystallize the residue to obtain 1-(2-cyanoethyl)-2,3-pentamethylene-1H-benz[g]indole.

Dissolve 86.4 g. (0.3 mole) of this product in 1250 ml. of methanol and saturate the resulting solution with dry hydrogen chloride. Add 5 ml. of water, boil under reflux for two hours, and cool. Filter off the ammonium chloride which separates, evaporate in vacuo, and take up the residue in ether. Wash with water and dry. Evaporate the solvent to obtain 1-(2-carbomethoxyethyl)-2,3-pentamethylene-1H-benz[g]indole.

Dissolve 15 g. of this compound in 50 ml. of methanol saturated at 0° C. with methylamine. After allowing to stand for 48 hours, evaporate the solvent by heating on the steam bath. Recrystallize to obtain 1-[2-(methylcarbamoyl) - ethyl] - 2,3 - pentamethylene - 1H-benz[g]indole.

Dissolve 10 g. of this compound in about 500 ml. of benzene and add to a solution of 10 g. of lithium aluminum hydride in 1 liter of anhydrous ether. After decomposing the complex by addition of 25 ml. of water, filter the mixture, dry the filtrate, and evaporate the solvent to obtain 1-(3-methylaminopropyl)-2,3-pentamethylene-1H-benz[g]indole.

EXAMPLE 13

*1-(3-aminopropyl)-2,3-pentamethylene-1H-benz[g]indole*

Add slowly a solution of 28.8 g. (0.1 mole) of 1-(2-cyanoethyl) - 2,3 - pentamethylene - 1H - benz[g]indole (obtained by the procedure of the previous example) in 100 ml. of dry benzene to a stirred suspension of 6 g. (0.15 mole) of lithium aluminum hydride in 500 ml. of dry ether. Stir and reflux overnight. Add 30 ml. of water with cooling. Filter off the insoluble material and evaporate the solvent from the filtrate to obtain the title product.

We claim:

1. A compound selected from the group consisting of indoles of the formula:

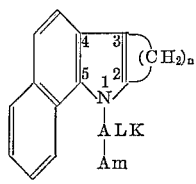

and pharmaceutically acceptable acid addition salts thereof, wherein $n$ represents a whole integer of from 4 to 13, ALK represents lower alkyl group of from 2 to 6 carbon atoms, and Am represents a member of the group consisting of primary amino, lower monoalkylamino, lower dialkylamino, piperidino, pyrrolidino, morpholino, piperazino and hydroxyalkyl piperazino.

2. A compound according to claim 1 wherein ALK is an ethyl group and Am is a dilower alkylamino group.
3. A compound according to claim 1 wherein ALK is a propyl group and Am is a dimethylamino group.
4. A compound according to claim 1 wherein ALK is an ethyl group and Am is a piperidino group.
5. 1 - (3 - dimethylaminopropyl) - 2,3 - pentamethylene-1H-benz[g]indole.
6. 1 - (2 - piperidinoethyl) - 2,3 - pentamethylene - 1H-benz[g]indole.

References Cited by the Examiner

UNITED STATES PATENTS

| | | | |
|---|---|---|---|
| 3,024,248 | 3/1962 | Werner | 260—319 |
| 3,093,651 | 6/1963 | Shapiro et al. | 260—293 |

OTHER REFERENCES

Migrdichian: Organic Synthesis, vol. II, page 1431 (1957), Reinhold Pub. Corp.

Rodd: Chemistry of Carbon Compounds, vol. IV^A, Heterocyclic Compounds, page 134 (1957), Elsevier Pub. Co.

WALTER A. MODANCE, *Primary Examiner.*

NICHOLAS S. RIZZO, *Examiner.*